Figure 1:
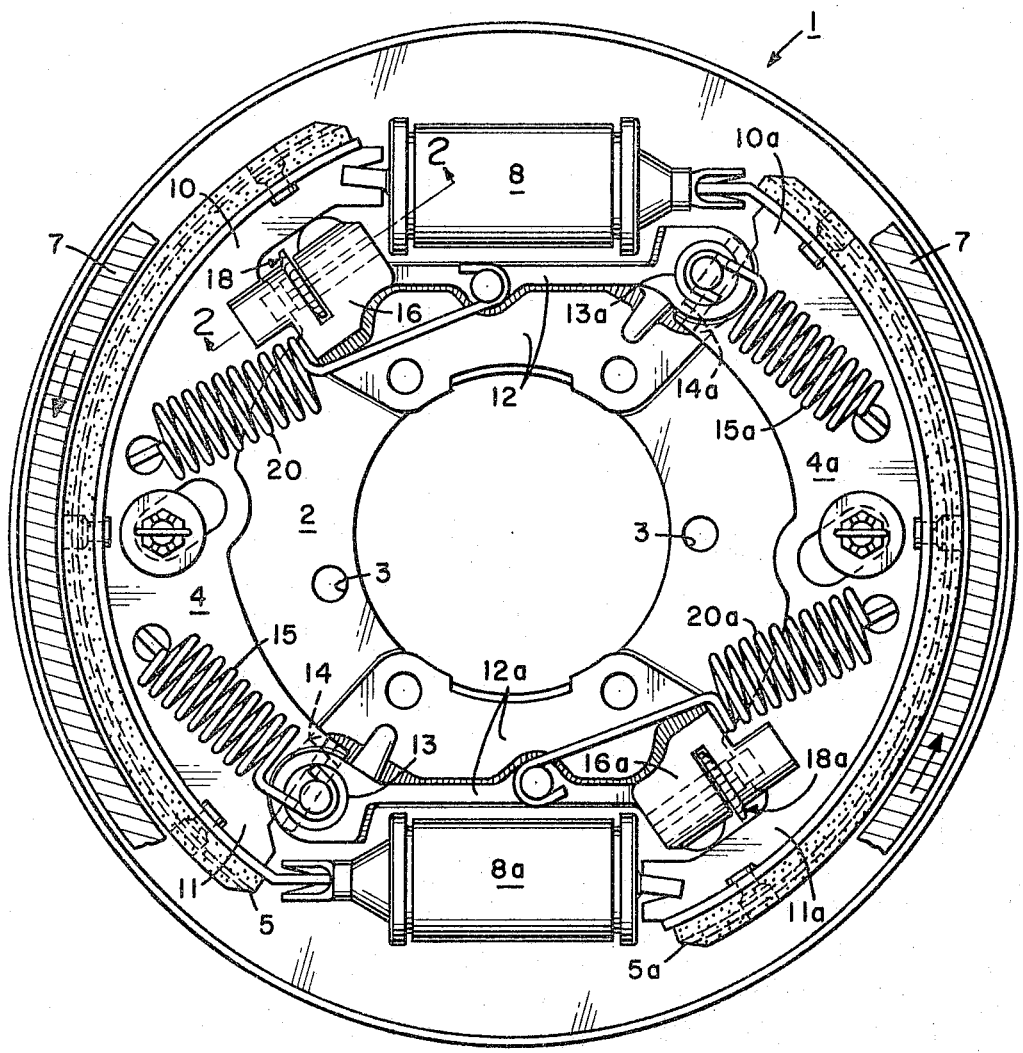

INVENTOR
JERRY T. PARKS
BY
*William R. O'Meara*

Jan. 24, 1967  J. T. PARKS  3,299,994
AUTOMATIC ADJUSTING MECHANISM
Filed Dec. 24, 1964  2 Sheets-Sheet 2

INVENTOR
JERRY T. PARKS
BY
William R. O'Meara

United States Patent Office 3,299,994
Patented Jan. 24, 1967

3,299,994
AUTOMATIC ADJUSTING MECHANISM
Jerry T. Parks, St. Charles, Mo., assignor to Wagner Electric Corporation, St. Louis, Mo., a corporation of Delaware
Filed Dec. 24, 1964, Ser. No. 420,886
7 Claims. (Cl. 188—79.5)

This invention relates to automatic adjusting mechanisms and more particularly to an automatic adjusting mechanism for controlling the displacement of a friction member of a friction device.

It is a general object of the present invention to provide a novel automatic adjusting mechanism for maintaining the displacement between a movable friction member and another friction member cooperable therewith substantially constant irrespective of wear of friction material or lining on one of the friction members occasioned by frictional engagement between the friction members.

Another object of the present invention is to provide a novel adjusting mechanism for automatically adjusting the retracted position of a friction member relative to a cooperating friction member for compensation for friction member wear which is compact and wherein relatively small parts are used and yet the mechanism is rugged and reliable in operation.

Another object is to provide an improved automatic adjusting mechanism for compensating for friction material wear in a friction device, such as a vehicle brake, wherein the working parts thereof are protected against the entrance of foreign matter, such as dust and the like, into the working parts.

Another object is to provide a novel automatic adjusting mechanism for maintaining a predetermined clearance between a pair of coacting relatively displaceable friction members of a friction device which includes a pre-assembled unit having working parts enclosed to obviate the entrance of foreign particles into the working parts and wherein the unit can be quickly and easily mounted in and removed from the friction device.

These and other objects and advantages of the present invention will be apparent hereinafter.

Briefly, the present invention embodies adjustment means for a movable friction member of a friction device which includes extendable means supported in the friction device and defining the retracted position of the friction member, driving means disposed within the extendable means and rotatable to control the extension of the extendable means and the retracted position of the friction member, and other means engaged for concert movement with the friction member and drivingly engageable with the driving means to effect adjustable rotation of the driving means for extending the extendable means and adjusting the retracted position of the friction member.

Figure 3:
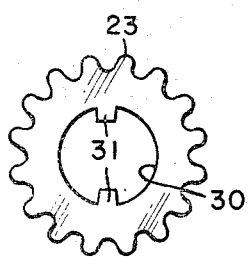
Figure 2:
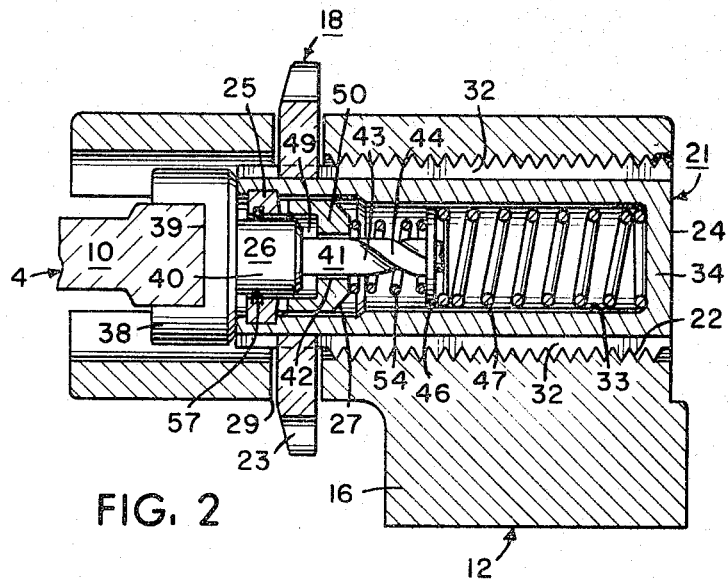
Figures 5, 5A:
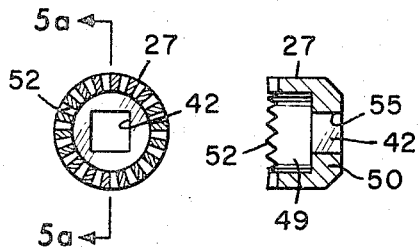
Figures 4, 4A:
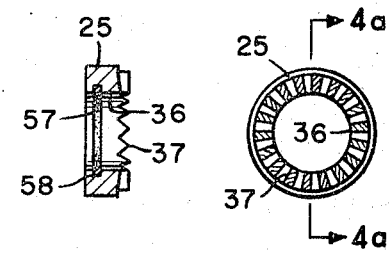
Figure 6:
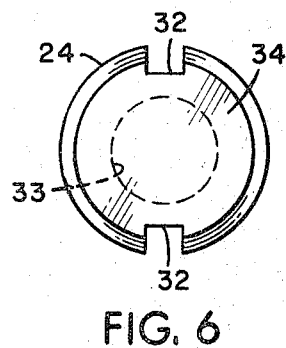

In the drawings which illustrate embodiments of the present invention,

FIG. 1 is an elevational view of a friction device embodying the present invention, FIG. 2 is a greatly enlarged sectional view taken along the line 2—2 of FIG. 1 showing the automatic adjusting mechanism according to one embodiment of the present invention, FIG. 3 is a plan view of the manual driving member of FIG. 2 on a reduced scale, FIG. 4 is a plan view of driven gear means of the mechanism of FIG. 2, FIG. 4a is a cross-sectional view taken along line 4a—4a of FIG. 4, FIG. 5 is a plan view of the drive means of the mechanism of FIG. 2, FIG. 5a is a cross-sectional view taken along line 5a—5a of FIG. 5, and FIG. 6 is a right end view of the adjusting member of FIG. 2.

Referring now to FIG. 1 in particular, a friction device or wheel brake assembly 1 is shown provided with supporting means or a backing plate 2 having a plurality of centrally located mounting apertures 3 therein for connection with a vehicle axle flange (not shown). A pair of opposed radially displaceable members or brake shoes 4, 4a are slidably disposed on backing plate 2 having friction material or linings 5, 5a secured thereto, such as by the well-known method of bonding or by rivets, as shown, the linings being adapted for frictional engagement with a relatively displaceable friction producing member or brake drum 7.

Actuator motors or wheel cylinders 8, 8a are diametrically and oppositely secured, such as by studs, on the backing plate 2 and are operatively connected with adjacent ends 10, 10a and 11, 11a of the brake shoes 4, 4a. Diametrically and oppositely disposed stationary supports or anchor brackets 12, 12a are also secured to the backing plate 2 between adjacent brake shoe ends 10, 10a and 11, 11a, with the anchor brackets also adapted for fixed connection, along with the backing plate, to the non-rotatable vehicle axle flange (not shown). Rotatable anchor pins 13, 13a having radially extending anchoring surfaces 14, 14a are pivotally mounted in the anchor brackets 12, 12a, and return springs 15, 15a are connected between the brake shoes 4, 4a and anchor brackets 12, 12a to normally urge the brake shoe ends 11, 10a into respective sliding and pivotal anchoring engagement with the anchoring surfaces 14, 14a. Anchor brackets 12, 12a are also provided with integral portions or housings 16, 16a, and adjustable anchor means or adjustment mechanisms, indicated generally at 18, 18a, are operatively positioned in the anchor bracket housings 16, 16a. A pair of return springs 20, 20a are connected between the brake shoes 4, 4a and the anchor brackets 12, 12a, respectively, to normally urge the brake shoe ends 10, 11a into respective engagement with the adjustable anchor mechanisms 18, 18a. When the drum 7 is rotating in the forward direction, as indicated by the directional arrow, the brake shoe ends 10 and 11a are the unanchored or displaceable ends. However, when the drum 7 is rotating in the reverse direction opposite to the directional arrow, the anchoring and displaceable ends of the brake shoes are also reversed, that is, the brake shoe ends 10 and 11a become the anchor ends and brake shoe ends 10a and 11 become the displaceable ends.

The automatic adjustment mechanisms 18, 18a, with which the present invention is primarily concerned, are identical in construction and operation except that mechanism 18 automatically adjusts the retracted position of shoe 4 to compensate for wear of lining 5 while mechanism 18a automatically adjusts the retracted position of shoe 4a to compensate for wear of lining 5a. For this reason, only mechanism 18 is shown and described herein in detail.

As seen in FIG. 2, the adjustment mechanism 18 includes a pre-assembled automatic adjustor unit 21 disposed in a threaded bore 22 in the housing 16 of bracket 12 for automatically adjusting the retracted position of brake shoe 4, and a driving or starwheel member 23 for manually adjusting the retracted position of shoe 4. The adjustor unit 21 includes an adjustable anchor member or extendable, externally threaded adjusting screw or housing 24 threadedly received in the bore 22 having driven gear means or a ratchet wheel member 25 thereon for concert movement therewith, a resiliently urged follower member or push rod 26 adapted for concert movement with end 10 of shoe 4, and annular drive gear means or ratchet wheel member 27 on the push rod 26 adapted for driving engagement with the driven gear 25 for rotating the adjusting screw 24 in response to a predetermined axial movement of push rod 26 for adjusting the retracted position of shoe 4, as will be fully discussed hereinafter. The starwheel member 23 is disposed in a slot 29 which intersects bore 22 in bracket housing 16, and is provided with an opening, indicated at 30 in FIG. 3, through which the adjusting unit 21 extends, the diameter of opening 30 being of sufficient size relative to screw 24 to permit free axial movement of the adjustor unit 21 relative to the starwheel member 23. The starwheel member 23 is also provided with a pair of opposed radially inwardly extending keys 31 which extend into a pair of axially extending opposed keyways 32 in screw 24, seen also in FIG. 6, and serve to rotate the screw 24 when starwheel member 23 is manually rotated to adjust the retracted position of the shoe 4.

The adjusting screw 24 is provided with a longitudinally extending bore 33 open at the left end of the adjusting screw and closed by an end wall 34 at the right end thereof. The driven gear 25 is disposed in a counterbore portion of bore 33 and rigidly secured concentrically with the screw 24 adjacent the open end of bore 33 in any suitable manner, such as by press fitting and/or staking it to the side walls of bore 33. Driven gear 25, shown also in FIGS. 4 and 4a, is provided with an annular bore or opening 36 and axially extending, circumferentially disposed gear or ratchet teeth 37 in the right side wall thereof, as viewed in FIG. 2.

The push rod 26 is slidably disposed in bore 33 and includes a head portion 38 external of screw 24 having a diametrically extending cross-slot 39 which receives the shoe end 10 whereby the rod 26 is held against rotation by the brake shoe 4. Integrally connected to and of smaller diameter than head 38 is an annular guide portion 40 which is slidable in the opening 36 in driven gear 25 to guide the push rod for axial movement. A spiral rod or stem 41 connected to the head 38 and guide portion 40 extends through a rectangular opening 42 in the drive gear 27 and is provided with a straight, longitudinally extending portion 43 which is a rectangular cross-section and a driving spiral portion 44 for driving engagement with the drive gear 27. The stem 41 is also provided with an annular flange member or snap ring 46 fixed to the end of the stem, such as by press fitting it thereon or by peening the end of the stem over the outer right side thereof. Push rod 26 is resiliently urged toward engagement with shoe end 10 by a compressive spring 47 disposed in the bore 33 between the snap ring 46 and the end wall 34 of the adjusting screw 24.

The drive gear 27 is generally cup-shaped in cross-section, it having an annular axially extending open-ended bore 49 open at the left end thereof and a right end wall 50 in which the opening 42 is formed. Gear 27, shown also in FIGS. 5 and 5a, is provided with a plurality of axially extending, circumferentially disposed gear or ratchet teeth 52 formed in the annular left side wall thereof which mesh with the teeth 37 on driven gear 25. As seen in FIG. 2, the drive gear 27 is disposed within bore 33 on the stem 41 concentric with the adjusting screw 24 and coaxial with the driven gear 25 so that the guide portion 40 is also slidable in the bore 49 of the drive gear. Drive gear 27 is resiliently normally urged into toothed engagement with the driven gear 25 by means of a spring 54 between the right side wall 50 of gear 27 and the snap ring 46.

Stem 41 may be formed, for example, from a straight metal bar of rectangular cross-section by suitably twisting the bar to provide the spiral end portion 44. The stem 41, being rectangular, is complemetary in configuration to the opening 42 in drive gear 27. The spiral portion 44 cooperates with the radially inner periphery or inner side walls, indicated at 55 in FIG. 5a, that define the opening 42, to translate linear or axial displacement movement of the push rod 26 and shoe 4 into rotary movement of drive gear 27, driven gear 25 and adjusting screw 24 to adjust the retracted position of the shoe 10, as will be explained in greater detail hereinafter.

The guide portion 40 of the push rod 26 is slidable in close fitting relation with the driven gear 25 of the adjusting screw 24 to substantially prevent the entrance of foreign particles, such as dirt, into the bore 33 and between working parts of the adjusting unit 21. In the illustrated embodiment of FIG. 2, an elastic sealing ring 57 is shown disposed between the adjusting screw 24 and guide portion 40 in an annular groove 58 (FIG. 4a) formed in the inner peripheral wall of the driven gear 25 so that the sealing ring 57 engages the outer surface of the guide portion 40 and serves as a wiper so as to seal the bore 33 against the entrance of foreign particles.

In FIG. 2, the head 38 of the push rod 26 is urged against the left end of screw 24 by the force of shoe return spring 20 acting on shoe 4 to define the retracted positions of the shoe and push rod 26. When the push rod 26 is in the retracted position, the drive gear 27 is on the straight portion 43 of the stem and the start of the spiral portion 44 is slightly axially spaced a predetermined distance from gear 27, and this provides a certain amount of lost motion between the gear 27 and push rod 26. Also, additional lost motion may result from "play" or clearance between the walls 55 of opening 42 and the stem 41 which permits a slight amount of relative rotation between the stem and drive gear 27. Thus, if the push rod 26 moves leftwardly from the position shown in FIG. 2, the straight portion 43 will first move through opening 42 without effecting rotation of gear 27, and then, upon further movement of push rod 26 a sufficient amount to take up any lost motion, the spiral portion 44 will move through opening 42 engaging the inner peripheral surface or walls 55 causing drive gear 27 to follow the spiral portion 44 and thereby rotate gear 27 in one direction. If the push rod 26 now moves rightwardly, the spiral portion 44 will cause the gear 27 to rotate in the reverse direction and return it to the position shown in FIG. 2. The direction of the spiral portion 44 is such that when the spiral portion 44 moves leftwardly in opening 42, as viewed in FIG. 2, the gear 27, as it is rotated, is urged toward driving engagement with driven gear 25 to rotate gear 25 and the adjusting screw 24 in one direction. On the other hand, when the spiral portion 44 is moving rightwardly in opening 42, the gear 27, as it rotates in the opposite direction, is urged by the spiral portion outwardly or in a direction away from driven gear 25 against the force of spring 54 without rotating the driven gear 25 and screw 24 in the opposite direction because any driving force applied to the driven gear 25 by the drive gear 27 is relatively slight for this direction of rotation and insufficient to overcome the inherent friction between the threads of screw 24 and the bracket housing 16.

In describing the operation of the automatic adjustment mechanism 18, it will first be assumed that there is a desired predetermined minimum amount of clearance between the drum 7 and lining 5 of brake shoe 4 and the drum is rotating in the forward direction so that end 10 is the displaceable end of shoe 4. When the wheel cylinders 8, 8a are energized, such as by transmitting fluid pressure thereto from a source of fluid pressure, for example, a master cylinder or the like (not shown), actuating forces are established which effect displacement movement of the brake shoes 4, 4a into frictional engagement with the drum 7 to thereby effect energization of the brake 1. During the above-mentioned displacement movement of shoe 4, the force of spring 47 causes the push rod 26 to follow the shoe 4; however, the displacement movement of the push rod 26 will be insufficient to effect rotation of the adjusting screw 24 due to the lost motion between the push rod 26 and the drive gear 27. If now the brake 1 is de-energized, such as by exhausting the fluid pressure in the wheel cylinders 8, 8a, the shoe return spring 20 will effect retractile movement of the shoes 4, 4a to the retracted position thereof and return the push rod 26 to the position shown in FIG. 2 and without having rotated driven gear 25.

As the friction lining 5 wears due to the frictional engagement thereof with the rotatable drum 7, the displacement movement of the shoe 4 and the push rod 26 increases because of the increase in the shoe clearance as a result of lining wear. As the shoe clearance slowly increases, the spiral portion 44 eventually enters the opening 42 during a displacement movement of the push rod 26 and effects rotation of drive gear 27 in one direction a slight amount which, in turn, rotates driven gear 25 and adjusting screw 24 a slight amount. This rotation of screw 24 is in a direction causing a slight axial or longitudinal advance movement thereof in a direction toward the drum 7, thus effecting a slight adjustment of the retracted position of shoe 4 in a direction tending to reduce the clearance between the lining 5 and drum 7. Because the effective gear or thread ratio between the threads on adjusting screw 24 and the spiral portion 44 is such that the displacement advance of the push rod 26 is greater than the axial advance of the screw 24, the above-mentioned rotation and axial advance of the screw 24 does not fully compensate for the amount of increase in shoe clearance; however, such increase in shoe clearance is extremely small. On the return or retractile stroke of the push rod 26, the spiral portion 44 will effect return rotation of the drive gear 27 to its original position shown in FIG. 2. During this return stroke, the spiral portion 44, as it moves in opening 42, will cause the drive gear 27 to become slightly out of mesh with driven gear 25 since gear 25 was slightly rotated from its original position, but because of "play" between the straight portion 43 of the push rod 26 and drive gear 27, the drive gear will usually be in full mesh with the gear 25 in the retracted position. The above slight amount of rotation of adjusting screw 24 increases the effective lost motion between the push rod 26 and the screw 24 so that further wear must take place before the push rod 26 can effect further rotation of screw 24. As the lining 5 continues to wear, the displacement stroke of the push rod 26 will increase and effect further rotation of the adjusting screw 24 in the above-described manner to limit increasing shoe clearance until the screw 24 has been rotated to such an extent that the drive gear 27, on one of the retraction strokes of the push rod 26, is indexed over the driven gear 25 by the spiral portion 44. Upon indexing, the drive gear 27 will be in full mesh with driven gear 25 in the retracted position but with driven gear 25 angularly displaced from its original position relative to drive gear 27 by one tooth or a distance equal to the angular distance between two adjacent teeth. At this time there will be a predetermined maximum amount of shoe clearance, but the increase in lost motion due to the above-mentioned rotation of the screw 24 is taken up as a result of the above indexing of gear 27. On the next displacement stroke of the shoe end 10 and push rod 26 immediately following the last named retraction stroke that effected indexing of the drive gear 27, the push rod 26 rotates the drive gear 27 which, in turn, rotates the driven gear 25 and adjusting screw 24 sufficiently to compensate for the wear of lining 5 or return the clearance between the lining 5 and drum 7 back to its minimum limit. With the clearance between the lining 5 and drum 7 at a minimum, no further adjustment of screw 24 will take place during subsequent brake applications until further lining wear occurs.

It is to be noted that as the clearance between lining 5 and the drum 7 increases from the predetermined minimum limit prior to the amount of wear necessary to effect the above-mentioned indexing of the drive and driven gears 27 annd 25, respectively, the adjustments of the screw 24 reduce or limit the rate of increase in clearance to lining wear. Because of this reduction in the rate of increase in clearance to lining wear, the adjustor 21 maintains the difference between the minimum and maximum shoe clearance extremely small. Thus, in the case of a vehicle brake utilizing a master cylinder, the foot pedal stroke, for a given amount of lining wear, is less than where no automatic adjustment means are used or where the vehicle brakes are equipped with known prior art automatic adjustment means which do not effect any adjustment until a predetermined maximum amount of shoe clearance is reached.

The brake shoe clearance can be manually adjusted, such as when installing new brake shoes, by manually rotating the starwheel 23 which, in turn, rotates adjusting screw 24. Since the drive gear 27 is on the straight portion 43 and slightly spaced from the spiral portion 44 of stem 41 when the brake shoe 4 is in the retracted position, the drive gear 27 will be able to move axially on the straight portion 43 against the force of spring 54 upon manual rotation of screw 24 and starwheel 23 and to thereby permit rotation of the screw 24 and gear 25 in either direction relative to gear 27. In other words, when the adjusting screw is manually rotated in either direction, the teeth on gear 25 will slip by the teeth on gear 27 since the gear 27 is able to move axially on the straight portion 43 without being urged into locking engagement with gear 25 by the spiral portion 44 because the spiral portion 44 is spaced from the drive gear 27 in the retracted position of the brake shoe 4. When a new brake shoe is installed, the manual adjustment of the screw 24 is, of course, not critical, since the adjustor unit 21, in the case of excess clearance, will automatically adjust the shoes to provide a desired predetermined minimum clearance upon one or more applications of the brake.

The automatic adjustor unit 21 is a pre-assembled unit which can be readily installed in the housing 16 before shoe 4 is attached without any alteration of brake parts. Unit 21 may be installed by placing the starwheel member 23 in slot 29 and inserting the unit 21 into the bore 22 so that the keyways 32 receive the keys 31 of the starwheel member. The brake shoe 4 may then be assembled in the friction device and the adjustor unit 21 manually adjusted in the manner previously discussed herein to provide a suitable shoe clearance. Also, in many cases, the adjustor unit 21 may be used to replace conventional manual adjusting screws in existing friction devices simply by removing the conventional adjusting screw and replacing it with the unit 21.

As is apparent from the foregoing description and drawing, neither the brake applying forces nor the shoe anchoring forces are applied to or transmitted through the driven and drive gears 25 and 27 of the illustrated adjustor unit 21; thus, these gears, as well as other parts of the adjustor unit, can be economically made relatively small. Also, with the right end of the bore 33 closed by wall 34 and with the push rod 26 in close fitting relation at the left end of the adjusting screw 24, and with the working parts, such as the drive and driven gears 27 and 25, respectively, spiral portion 44, and springs 47, 54, disposed within the bore 33 of adjusting screw 24, these working parts are enclosed by the adjusting screw and protected from foreign particles, such as dust and the like.

Also, in the illustrated embodiment of the adjustor unit 21, since the driven gear 25 of the adjusting screw 24 is disposed in bore 33 adjacent the left end thereof, and the drive gear 27 is provided with the open-ended bore 49, the guide portion 40 of the push rod 26 is slidable or axially movable in the driven gear opening 36 and bore 49. This construction and arrangement of parts permits use of a spring 47 of desired strength and length with an adjusting screw 24 of minimum length to provide a highly compact unit.

It is now apparent that novel automatic adjustment means meeting the objects set out hereinbefore are provided and that changes and modifications in the disclosure may be made by those skilled in the art without departing from the spirit and scope of the invention as defined by the claims which follow.

The embodiments of the invention in which an exclusive property or privilege is claimed are defined as follows:

1. In a friction device having a friction member for movement between a retracted position and a displaced position for frictional engagement with a coacting member, adjustable means supported on said friction device for rotational and linear movement relative thereto and defining a retracted position for said friction member, a bore in said adjustable means, and motion translating means including rotatable drive means enclosed within said bore and drivingly engaged with said adjustable means to effect the rotational and linear movement thereof, means movable relative to said adjustable means for following engagement with said friction member, and other means movable relative to said rotatable drive means for driving engagement therewith to translate the following movement of said last named means into adjustable rotation of said rotatable drive means and adjustable means, said adjustable means being linearly movable relative to said friction device in response to the adjusting rotation thereof to redefine the retracted position for said friction member.

2. In the friction device according to claim 1 including means on said adjustable means defining an end wall of said bore, said rotatable drive means being drivingly engaged with said end wall.

3. In the friction device according to claim 2, including coupling means respectively on said end wall and said rotatable drive means and engageable to define a driving connection therebetween, and resilient means urging said coupling means into engagement to normally maintain said driving connection.

4. In the friction device according to claim 2, including another bore in said extendable member extending through said end wall, gear teeth on said end wall and disposed in radial spaced relation with said other bore, and other gear teeth on said rotatable drive means for driving engagement with said first named gear teeth, said last named means being movable in said other bore.

5. In the friction device according to claim 4, wherein said rotable drive means includes a sleeve member having opposed end portions, said other gear teeth being radially disposed on one of said end portions, and aperture means extending through said sleeve member between said opposed ends, and said last named means including a spiral portion movable through said aperture means for driving engagement with said sleeve member to translate the following movement of said last named means into rotational movement of said sleeve member.

6. In the friction device according to claim 2, including another bore in said adjustable member extending through said end wall, said last named means being movable in said other bore, seal means in adjustable means between said other bore and said last named means, and wall means on said adjustable means opposite to and spaced from said end wall for closing said bore.

7. In the friction device according to claim 3, wherein said last named means extends through said end wall, aperture means in said rotatable drive means and defining a driven surface, a spiral drive portion on said other means for movement through said aperture means and driving engagement with said driven surface to translate the following movement of said last named means into rotational movement of said rotatable drive means, said resilient means being biased between said last named and said rotatable drive means, and other resilient means for urging said last named means toward engagement with said friction member.

References Cited by the Examiner
UNITED STATES PATENTS 1,817,081  8/1931  Jonas.

References Cited by the Applicant
UNITED STATES PATENTS 1,613,778  1/1927  Worden.
2,130,875  9/1938  Colman.
2,695,078  11/1954  Brooks.
2,730,205  1/1956  Bauman.
2,748,901  6/1956  Brooks.
2,774,445  12/1956  Pontius.
2,788,095  4/1957  Brooks.
2,818,143  12/1957  Phillips.
2,938,610  5/1960  Dombeck.

DUANE A. REGER, *Primary Examiner.*